US006707930B2

(12) United States Patent
Kalker et al.

(10) Patent No.: US 6,707,930 B2
(45) Date of Patent: Mar. 16, 2004

(54) METHOD AND ARRANGEMENT FOR EMBEDDING A WATERMARK IN AN INFORMATION SIGNAL

(75) Inventors: Antonius Adrianus Cornelis Maria Kalker, Eindhoven (NL); Jaap Andre Haitsma, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 83 days.

(21) Appl. No.: 10/003,064

(22) Filed: Nov. 2, 2001

(65) Prior Publication Data

US 2002/0085736 A1 Jul. 4, 2002

(30) Foreign Application Priority Data

Nov. 7, 2000 (EP) .......................................... 00203894

(51) Int. Cl.[7] ................................................ H04K 1/00
(52) U.S. Cl. ...................................... 382/100; 380/252
(58) Field of Search ................................. 382/100, 232; 380/210, 252, 287, 54; 713/176

(56) References Cited

U.S. PATENT DOCUMENTS

| 6,181,802 B1 | * | 1/2001 | Todd ........................... 382/100 |
| 6,222,932 B1 | * | 4/2001 | Rao et al. .................... 382/100 |
| 2002/0015508 A1 | * | 2/2002 | Hannigan et al. ........... 382/100 |

FOREIGN PATENT DOCUMENTS

WO  WO 99/45705 A2 * 9/1999  .......... H04N/5/913

OTHER PUBLICATIONS

Echizen et al., "General Quality Maintenance Module for Motion Picture Watermarking," *IEEE Trans. on Consumer Electronics*, vol. 45, No. 4, Nov. 1999, pp. 1150–1158.*
Kankanhalli et al., "Content Based Watermarking of Images," *Proc. ACM Multimedia '98*, Sep. 1998, pp. 61–70.*

Delaigle et al., "A Psychovisual Approach for Digital Picture Watermarking," *J. of Electronic Imaging*, vol. 7, No. 3, Jul. 1998, pp. 628–640.*

Delaigle et al., "Watermarking algorithm based on a human visual model," *Signal Processing*, vol. 66, May 1998, pp. 319–335.*

Podilchuk et al., "Image–Adaptive Watermarking Using Visual Models," *IEEE J. on Selected Areas in Communications*, vol. 16, No. 4, May 1998, pp 525–539.*

Kundur et al., "A Robust Digital Image Watermarking Method using Wavelet–Based Fusion," *IEEE Proc. Int. Conf. on Image Processing*, Oct. 1997, pp. 544–547.*

Jayant et al., "Signal Compression Based on Models of Human Perception," *Proc. of the IEEE*, vol. 81, No. 10, Oct. 1993, pp. 1385–1422.*

Suthaharan, "Transform Domain Technique: Robust Watermarking for Digital Images", *Proceedings of the IEEE Southeastcon 2000*, Apr. 7–9, 2000, pp. 407–412, XP001066589.

* cited by examiner

*Primary Examiner*—Andrew W. Johns

(57) ABSTRACT

The invention relates to a method of embedding a watermark W in an information signal P, to a corresponding arrangement for embedding a watermark W in an information signal P, to an information signal with an embedded watermark, and to a storage medium 50 having stored thereon an information signal P with an embedded watermark W. The watermark is embedded in the information signal by deriving sub-patterns $W_i$ from said watermark pattern W, wherein the energy spectrum concentration of each sub-pattern $W_i$ has a dominent orientation. The local weight factors $\lambda(P)$ for said watermark sub-patterns $W_i$ are determined based on the local energy spectrum of the information signal P in said dominent orientation. Said watermark sub-patterns $W_i$ are locally weighted using said determined local weight factors $\lambda(P)$. Finally, the locally weighted watermark sub-patterns $(W_i)$ are added to the information signal P.

5 Claims, 2 Drawing Sheets

METHOD AND ARRANGEMENT FOR EMBEDDING A WATERMARK IN AN INFORMATION SIGNAL

Figure 1:
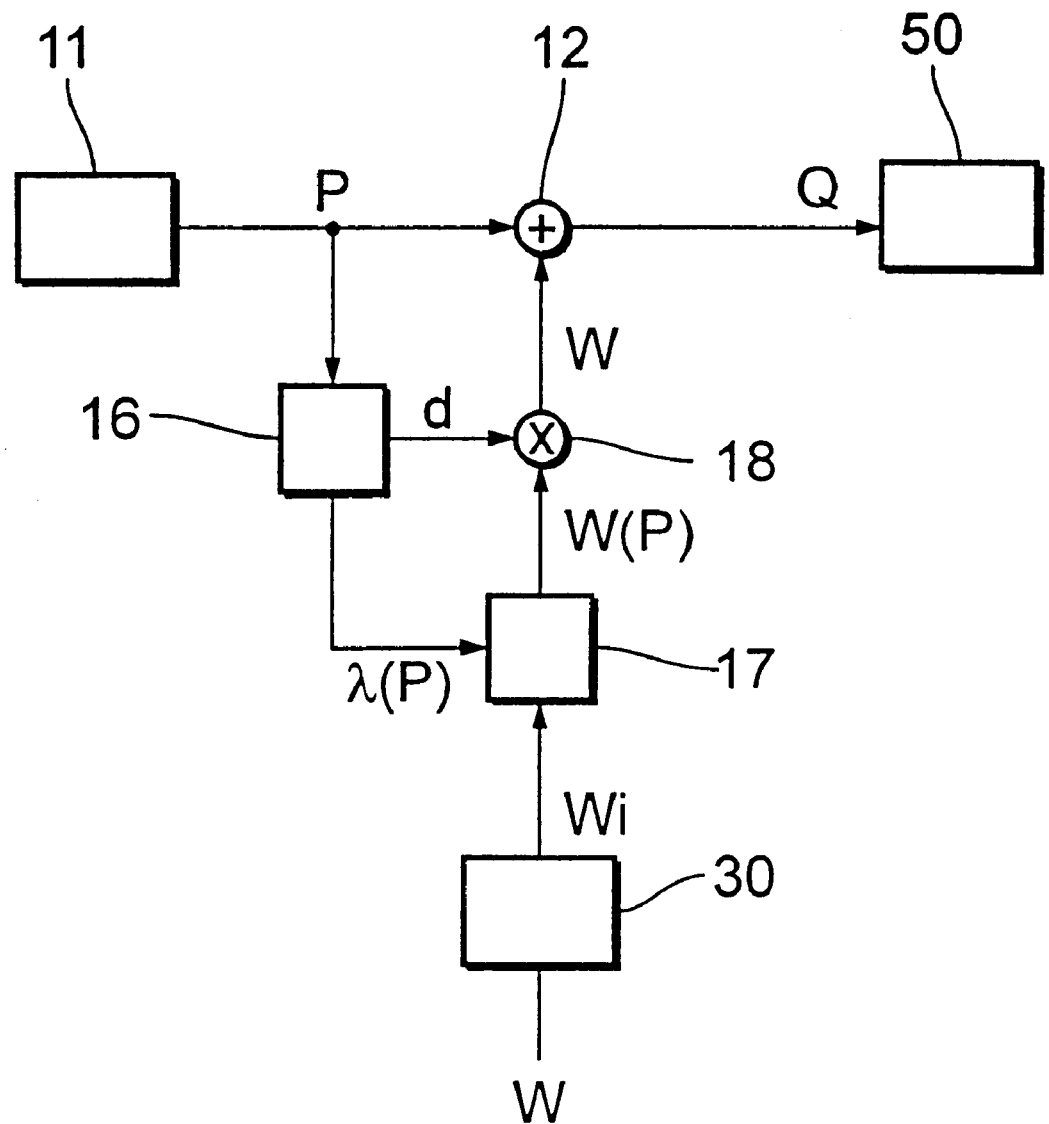

The invention relates to a method and arrangement for embedding a watermark in an information signal, an information signal with an embedded watermark, and a storage medium having stored thereon an information signal with an embedded watermark.

The ongoing digitalization of multimedia data has had a dual effect. While on the one hand it has enabled faster and more efficient storage, transfer and processing of signals, on the other hand duplication and manipulation of such signals has also become very easy and undetectable. Security concerns over copyright violation of multimedia data have also increased with the growth of computer networks like the Internet, which enable fast and error free movement of any unauthorized duplicate and possibly manipulated copy of multimedia information. Thus, there is a need to maintain some sort of copyright information in such open environment. These copyright information would need to be both easy to detect and yet hard to remove. The only solution appears to be to cement into the image, video or audio data a secondary signal that is not the perceptible and is bonded so well to the original data that it is inseparable and survives any kind of multimedia signal processing. Such secondary information is usually called a watermark.

Watermarking an image is essentially a process of altering the pixel values of an image in a manner that ensures that a viewer of the image does not notice any perceptual change between the original and the watermark image. Altering a large number of pixel values in an arbitrary manner will result in noticeable artifacts. Every pixel value of an image can be altered only to a certain limit without making perceptible differences to the image quality.

From WO 99/45705 a method for embedding auxiliary data in a signal is known. The data is encoded into the relative position or phase of one or more basic watermark pattern. To avoid that the watermark detection process needs to search the watermark over a large space, the watermark is generated by repeating smaller units called "tiles" over the extent of the image. Furthermore a local depth map or visibility mask $\lambda(P)$ also referred to as local weight is computed. At each pixel position, $\lambda(P)$ provides a measure for the visibility of additive noise.

In other words, $\lambda(P)$ measures the local sensitivity of the image to degradation by additive noise, and is in practical situations determined by the magnitude of the response of a Langrangian high-pass filter L=[-1-1-1; -1 8-1, -1-1-1]. The value of the tiled watermark at each position is multiplied by the visibility value of $\lambda(P)$ at that position. Accordingly, the equation for an information signal with an embedded watermark is as follows:

$$Q=P+\lambda(P)W \quad (1)$$

where P is the information signal into which a watermark W is to be embedded resulting in an information signal Q with an embedded watermark W.

The next step would be to detect whether or not a particular watermark pattern W is included in the signal in question. The signal in question Q and the watermark pattern W are subject to correlation wherein the signal in question Q is possibly pre-filtered to increase the detection robustness. The watermark pattern W is detected to be present if a correlation value is larger than a given threshold.

In many situations this is a method useful for adapting the energy of the watermark to the local properties of the image. For reasons of complexity and simplicity, the pattern W was chosen as a spectrally white pattern, wherein each frequency component having more or less the same power. In particular this method performs well in image regions which have no strong directional preference. However, in image regions which do have a strongly directional preference, for example along edges, this method for adapting the watermark strength creates artifacts in the cover image.

In "Content Based Watermarking of Images", Kankanhalli et al. 6th ACM International Multimedia Conference, 1998, Bristol, UK (also published on the webpage: http://info.acm.org/sigmm/MM98/electronic_proceedings/kankanhalli/index.html) a new method of analyzing the noise sensitivity of every pixel based on the local region image content, such as texture, edge and luminance information is proposed. This results in a just noticeable distortion mask for the image to be watermarked. Then each bit of the watermark is spread spatially and shaped by a pseudo-noise sequence such that its amplitude is kept below the noise sensitivity of the pixel into which it is embedded.

Studies on the human perception of images have resulted in a so called Human Visual System (HVS). Details thereon are published in "Signal compression based on models of human perception", by Johnston et al. in the Proceedings of the IEEE, 81 (10), page 1385 to 1422, October 1993.

It is known that the Human Visual System (HVS) is more sensitive to orthogonal noise than to parallel noise, explaining the observed watermark artifacts in regions which have dominant directionality, in particular in case of edges.

According to the HVS the visibility of distortions in a region of the image depend on Edge information of an image, which is a very important factor for the perception of an image. It has the least noise sensitivity and it is therefore essential to maintain edge integrity in order to preserve the image quality;

Smooth areas influence our perception together with the edge information;

In textures the distortion visibility is low, i.e. a strongly texture region has a very high noise-sensitivity level;

Brightness sensitivity: When the mean value of the square of the noise is the same as that of the background, the noise tends to be most visible against a mid-gray background, i.e. mid-gray regions are more sensitive to noise as compared to other regions.

The watermark is embedded into the image by scaling or weighting the watermark according to the noise sensitivity of the particular image region. This ensures that the watermark distorts the regions least that are sensitive to changes and exploits perceptional spatial redundancies in the areas of high detail and structure.

The watermark embedding methods known from the prior art have in common that they do not fully exploit spatial perceptional redundancies to incorporate watermark energy into the information signal.

It is an object of the invention to provide a method for embedding a watermark in an information signal, wherein said watermark is more robust as compared to known watermarks, while the watermark detection is kept unchanged. Further a corresponding arrangement for embedding a watermark in an information signal, an information signal with an embedded watermark, and a storage medium having stored thereon an information signal with an embedded watermark shall be provided.

This object is achieved according to the invention by a method as set forth in claim 1, by an arrangement as set forth in claim 6, by an information signal as set forth by claim 7 and by a storage medium as set forth in claim 8.

The invention is mainly based on the idea, that a watermark is embedded in an information signal by deriving watermark sub-patterns from a watermark pattern. Each of these derived sub-patterns have an energy spectrum concentration with an dominant orientation. The local weight factors for said sub-patterns are determined based on the local energy spectrum of the information signal in said dominant orientation and the watermark sub-patterns are locally weighted using the determined local weight factors. Finally, the locally weighted watermark sub-patterns are added to the information signal. Thus orientation redundancies of the information signal can be exploited to incorporate more watermark energy into the information signal without a perceptible distortion.

In an aspect of the invention the local weight factors for said sub-patterns are determined based on the local spatial energy spectrum of the information signal in said dominant orientation. Thus spatial orientation redundancies of the information signal can be exploited to incorporate more watermark energy into the information signal.

According to an aspect of the invention the activity of the information signal is taken into account when determining the local weight factors.

In a further aspect of the invention the sum of said sub-patterns is approximately equal to said watermark. Accordingly, known watermark detection methods can be used to detect said sub-patterns.

In still a further aspect of the invention an arrangement for embedding a watermark in an information signal is provided. Said arrangement comprises means for deriving sub-patterns from said watermark pattern, wherein the energy spectrum concentration of each sub-pattern has a dominant orientation. Determining means for determining the local weight factors based on the local energy spectrum of the information signal in said dominant orientation and a weighting means for locally weighting said watermark sub-patterns based on said local weight factors is also included in the arrangement. Finally said arrangement comprises adding means for adding locally weighted watermark sub-patterns to the information signal.

The invention is also embodied in an information signal with an embedded watermark as claimed in claim 7 and in a storage medium having stored thereon an information signal with an embedded watermark as claimed in claim 8. It shall be understood that the information signal and the storage medium can be further developed and that there are further embodiments thereof, which further developments and further embodiments are identical or similar to those described above with reference to the method of embedding a watermark in an information signal and are laid down in the subclaims of claim 1.

Other preferred embodiments of the invention are disclosed in the dependent claims.

Figure 2:
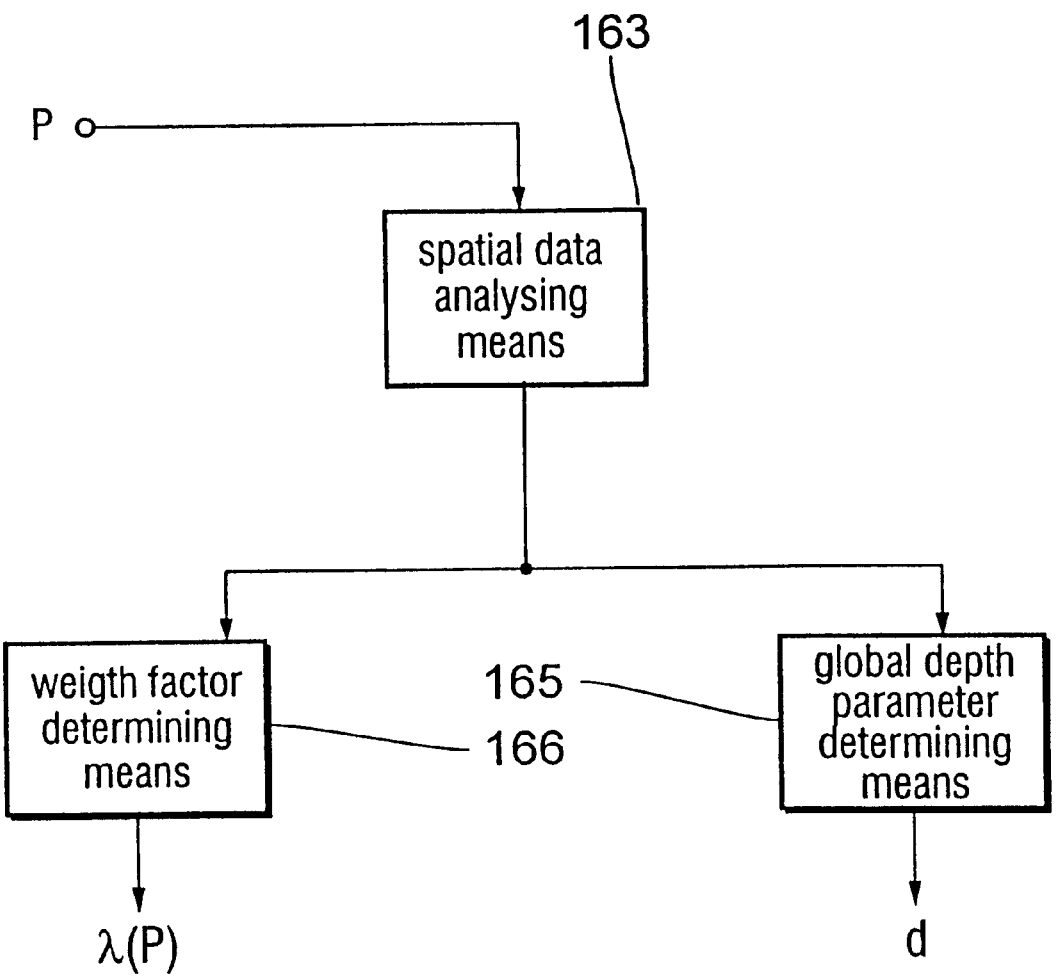

The invention and preferred embodiments thereof are explained hereinafter in more detail with reference to the following drawings, in which FIG. 1 shows a schematical block diagram of an arrangement for embedding a watermark in an information signal according to the invention, and FIG. 2 shows a block diagram of a parameter determining means used in the arrangement for embedding a watermark in an information signal according to FIG. 1.

In FIG. 1 an embedder for embedding a watermark into an information signal is illustrated. The embedder includes an image source 11, which produces an information signal P, a parameter determining means 16 for determining weight factors $\lambda(P)$ and a global depth parameter d, a modulator 17 for modulating the watermark W with the weight factors $\lambda(P)$, a multiplier 18 for multiplying the modulated watermark W (C) with the global depth parameter d, and an adder 12 which adds a watermark W to the information signal P, resulting in a watermarked information signal Q. The resulting watermarked information signal Q can be stored on a storage medium 50.

In FIG. 2 the parameter determining means 16 is shown in more detail. The parameter determining means 16 includes a spatial data analyzing means 163, which receives the information signal P as its input and is connected to the weight factor determining means 166 and the global depth parameter determining means 165 on its output side. The weight factor determining means 166 generates weight factors $\lambda(P)$ as its output signal. The global depth parameter determining means 165 generates the global depth parameter d as its output signal.

When determining the weight factors $\lambda(P)$ with which each pixel in the information signal P is to be modulated i.e. multiplied, respectively, the spatial data of the information signal P is analyzed according to the properties of the Human Visual System HVS for still images by the spatial data analyzing means 163. This can for example be done by evaluating the well known JPEG quantization table. The analyzing results provide the information how much watermark energy can be embedded in a respective pixel of the information signal P without being perceped. According to the analyzing results a weight factor $\lambda(P)$ for each pixel in the information signal P is determined, the watermark is weighted by multiplying the watermark pixels with the respective local weight factors, and is added to the respective pixels of the information signal by said adder 12.

For image regions having a strongly directional preference, for example along edges, methods known in the prior art for adapting the watermark strength create artifacts in directions orthogonal to the dominant direction of the cover image. The principal reason for these artifacts is mainly the non-directionality of both the watermark pattern W and the local weighting $\lambda(P)$. As said local weighting $\lambda(P)$ is directional insensitive, the watermark embedding method causes the introduction of watermark frequency components orthogonal in the case of dominant local directions.

Accordingly, in an embodiment of the present invention the watermark pattern W is split into several sub-patterns $W_i$ by the sub-pattern deriving means 30, as shown in FIG. 1, where each sub-pattern has a dominant orientation. For embedding the watermark the energy of the host signal, i.e. the information signal, is determined in each of the dominant directions in the spatial data analyzing means 163. This information is forwarded to the weight factor determining means 166, where the weight factors for the respective sub-patterns are determined accordingly. Each sub-pattern $W_i$ is weighted according to the determined weight factors by the multiplier 17 and is added to the information signal by the adder 12. By this splitting of the watermark pattern W into several sub-patterns $W_i$ the watermark pattern is made directional sensitive. By ensuring that the sum of the patterns $W_i$ is equal to the original pattern W, the watermark detection is still achieved by correlating the signal in question with the original mother pattern W.

Each of the sub-patterns $W_i$ derived from the single watermark pattern W has a power spectral density with most of its energy concentrated in a direction i (i=horizontal, vertical or diagonal).

The above is best explained by giving an example. Consider the original Laplacian sensitivity measure to be $L=[-1 -1 -1; -1\ 8 -1; -1 -1 -1]$. This sensitivity measure is, as already mentioned above, insensitive to orientation, but it can easily be split into four orientation sensitive measures as follows:

$L_v = [-1\ -1\ -1;\ 2\ 2\ 2;\ -1\ -1\ -1]$
$L_h = [-1\ 2\ -1;\ -1\ 2\ -1;\ -1\ 2\ -1]$
$L_u = [2\ -1\ -1,\ -1\ 2\ -1;\ -1\ -1\ 2]$
$L_d = [-1\ -1\ 2;\ -1\ 2\ -1;\ 2\ -1\ -1]$

The four directional filters $\{L_i\}$ have the property that their total sum is equal to the original sensitivity filter L. The directional watermark patterns $W_i$ is now constructed as $$W_i = L_i \otimes (L+e)^{-1} \otimes W, \quad (3)$$

where e is a small positive constant that prevents singularities at zeros of L. With this definition (i) the pattern $W_i$ has a dominant direction corresponding to the filter $L_i$, and the sum of the four patterns is approximately equal to the original ("mother") pattern W.

$$W = Wv + Wh + Wu + Wd \quad (4)$$

The local weight factor $\lambda(P)$ can be changed accordingly into four local weight factor matrixes or four local depth matrixes $\Lambda = \Lambda_h + \Lambda_v + \Lambda_d + \Lambda_d$.

The watermark embedding formula now becomes $$W = P + d\Sigma |L_i| W_i, \quad (5)$$

where d represents the global watermark strength. It is to be noted that in textured areas, with no preferential direction, this embedding formula is effectively equivalent to the original non-directional embedding method $$Q = P + d|L|W. \quad (6)$$

As each of the four patterns still has a strong correlation with the mother pattern W (approximately ¼ of the self-correlation of W), watermark detection is still possible by using correlation with the single pattern W.

The watermark detection can be achieved as described in WO 99/45 705. Accordingly, known watermark detection method s can be applied.

What is claimed is:

1. Method of embedding a watermark (W) in an information signal (P), comprising the steps of:

deriving sub-patters ($W_i$) from said watermark pattern (W) using zero-phase convolutions, wherein the energy spectrum concentration of each sub-pattern ($W_i$) has a dominant orientation;

determining local weight factors ($\lambda(P)$) for said watermark sub-patterns ($W_i$) based on the local energy spectrum of the information signal (P) in said dominant orientation;

locally weighting said watermark sub-patterns ($W_i$) based on said determined local weight factors ($\lambda(P)$), and adding locally weighted watermark sub-patterns ($W_i$) to the information signal (P).

2. Method according to claim 1, wherein the determination of local weight factors ($\lambda(P)$) for said watermark sub-patterns ($W_i$) is based on the local spatial energy spectrum of the information signal (P) in said dominant orientation.

3. Method according to claim 1, wherein the local weights factors ($\lambda(P)$) are further determined based on the activity of the information signal.

4. Method according to claim 1, wherein the sum of said sub-patterns ($W_i$) is approximately equal to said watermark (W).

5. Arrangement for embedding a watermark (W) in an information signal comprising:

deriving means (30) for deriving sub-patters ($W_i$) from said watermark pattern (W) using zero-phase convolutions, wherein the energy spectrum concentration of each sub-pattern ($W_i$) has a dominant orientation;

determining means (16) for determining the local weight factors ($\lambda(P)$) for said watermark sub-patterns ($W_i$) based on the local energy spectrum of the information signal (P) in said dominant orientation;

weighting means (17) for locally weighting said watermark sub-patterns ($W_i$) based on the said determined local weight factors ($\lambda(P)$), and adding means (12) for adding locally weighted watermark sub-patterns ($W_i$) to the information signal (P).

\* \* \* \* \*